US006857015B1

(12) United States Patent
Michaud et al.

(10) Patent No.: US 6,857,015 B1
(45) Date of Patent: Feb. 15, 2005

(54) METHOD AND SYSTEM FOR REMOTELY OBSERVING AND CONTROLLING OBJECTS

(75) Inventors: Bertrand Michaud, Calgary (CA); Mark Kudryk, Calgary (CA); Zachariah Scott, Calgary (CA)

(73) Assignee: Wind River International, Ltd., Toronto (CA)

( * ) Notice: Subject to any disclaimer, the term of this patent is extended or adjusted under 35 U.S.C. 154(b) by 0 days.

(21) Appl. No.: 09/332,192

(22) Filed: Jun. 14, 1999

(51) Int. Cl.⁷ .......................... G06F 15/173; G06F 3/00
(52) U.S. Cl. ...................... 709/224; 709/223; 719/317; 719/318
(58) Field of Search ................................ 709/224, 223, 709/317, 318, 230

(56) References Cited

U.S. PATENT DOCUMENTS

| | | | |
|---|---|---|---|
| 5,613,124 A | | 3/1997 | Atkinson et al. |
| 5,781,703 A | * | 7/1998 | Desai et al. .................. 706/50 |
| 5,963,937 A | | 10/1999 | Yamasaki et al. |
| 6,061,721 A | * | 5/2000 | Ismael et al. ............... 709/218 |
| 6,134,581 A | * | 10/2000 | Ismael et al. ............... 709/202 |
| 6,230,160 B1 | * | 5/2001 | Chan et al. ............. 707/103 X |
| 6,353,860 B1 | * | 3/2002 | Hare et al. .................. 709/202 |
| 6,356,931 B2 | * | 3/2002 | Ismael et al. ............... 709/202 |
| 6,385,661 B1 | * | 5/2002 | Guthrie et al. ............. 709/316 |
| 6,466,974 B1 | * | 10/2002 | Nelson et al. .............. 709/223 |

FOREIGN PATENT DOCUMENTS

| | | |
|---|---|---|
| EP | 0 284 924 | 10/1988 |
| EP | 0 694 831 | 1/1996 |
| EP | 0 789 300 | 8/1997 |
| EP | 0 909 057 | 4/1999 |
| EP | 0 913 769 | 5/1999 |
| EP | 0 915 419 | 5/1999 |
| FR | A 2 667 419 | 4/1992 |
| GB | 2 266 172 | 10/1993 |
| GB | 2 311 390 | 9/1997 |
| JP | 02 005191 | 1/1990 |
| WO | WO 98 25239 | 6/1998 |

OTHER PUBLICATIONS

Vanhelsuwe, Laurence. "Mastering JavaBeans", 1997, SYBEX inc., ISBN 0–7821–2097–0, Chapter 2 "JavaBeans: An Overview".*
Java Dynamic Management Kit 3.0 Programming Guide, 1998 Sun Microsystems Inc.*
"Improved Process for Visual Development of Client/Server Programs", IBM Technical Disclosure Bulletin, vol. 41, Issue 1, Jan. 1, 1998, pp. 281–284.*

(List continued on next page.)

*Primary Examiner*—David Wiley
*Assistant Examiner*—George Neurauter
(74) *Attorney, Agent, or Firm*—Fay Kaplun & Marcin, LLP

(57) ABSTRACT

A method and system for remotely observing and controlling objects in a networked computer, such as an intelligent device connected to a server, which uses less hardware resources in the device while allowing the server to probe (i.e. observe and/or control) objects in the device. Software within the device includes at least one 'probeable' object capable of being observed or controlled and a probe registry, to which the probeable object can report itself. Software within the server includes a probe registry managed object which is a proxy for the probe registry, allowing the probe registry to report the type(s) of probeable objects executing on the device to an application executing on the server. A probe managed object which is a proxy for the probe object is also resident on the server, such that when the probe object is downloaded onto the device from the server, information gathered by the probe object can be reported to the application via the probe managed object. The result is that the device can be remotely observed and controlled with a reduced consumption of device hardware resources, and updates to device software only require the creation of a new probe, and do not require a rewrite of the server application.

18 Claims, 10 Drawing Sheets

OTHER PUBLICATIONS

Ritter, John, "The Middleware Muddle", SIGMOD Record, vol. 27, No. 4, Dec. 4, 1998.*

Wong et al, "Java–based Mobile Agents", Communications of the ACM, vol. 42, No. 3, Mar. 1999, pp. 92–102.*

Marsic et al, "An Application Framework for Synchronous Collaboration using Java Beans", Proceedings of the 32nd Hawaii International Conference on System Sciences, Jan. 1999.*

"Event Handling, Alarm Clock, and Monitoring Services," Sun Microsystems, Inc., 1998, pp. 1–25.

"JAVA Dynamic Management Kit," Sun Microsystems, Inc., 1998, pp. 1–2.

Slack, S., "Published Works: Extending Your Desktop With Pilot," The Windward Group—News and Views, Sep. 1996. pp. 1–19.

Sun Microsystems, Java Beans Version 1.01, Hamilton, G., 1996, Sun Microsystems, Mountainview, CA.

* cited by examiner

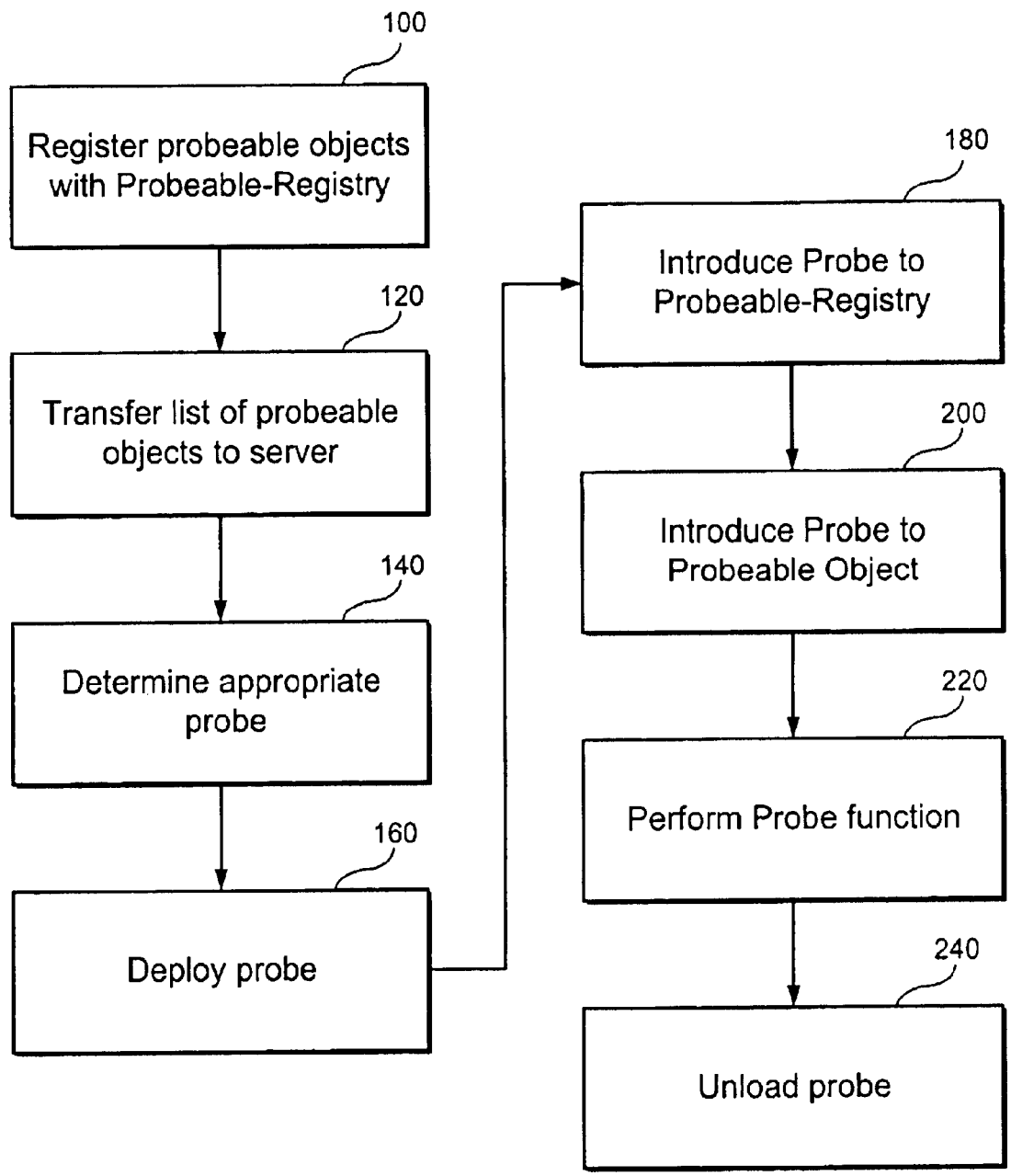
F I G. 3

METHOD AND SYSTEM FOR REMOTELY OBSERVING AND CONTROLLING OBJECTS

FIELD OF THE INVENTION

The present invention relates generally to remote monitoring and management of computers. More specifically, the present invention relates to a method and system for observing and controlling objects on a remote networked computer.

BACKGROUND OF THE INVENTION

The development of network computing ("NC") technology has spawned the development of several intelligent devices, ranging from simple thin-client desk-top computers, to internet-aware screen phones, mobile phones, personal digital assistants ("PDAs"), public kiosks, smart-card based banking devices, etc. The Java computer language has been an important feature of this technological development, as it provides a "Write Once, Run Anywhere" platform which is an effective way to pass an application from a server to a device for local execution on the device. Thus, Java provides the ability to transparently deliver, via a communications mechanism such as a general purpose network or a special purpose communications port, software to a variety of devices having different hardware platforms and has become a standard language for internet applications.

In order to improve functionality of intelligent devices, it can be desirable to remotely observe, configure and/or control these devices. For example, when a server is connected to download an application to a device, it can be desired to interrogate the device to determine the available resources in the device, such as whether the device has a necessary minimum amount of free memory. In addition, the ability to examine, configure and control applications and/or the device remotely can be of assistance to developers attempting to troubleshoot or debug hardware and/or software.

While Java is a useful and popular language for internet applications, conventional Java programming techniques are generally limited in their ability to remotely observe and/or control the device. For example, one known method of observing and/or controlling objects on a remote device involves also programming each object to be executed on the device to be accessible by an application executing on a server. This requires an increase in the memory required for each object, as each instantiated object has a larger memory footprint and, as a result, valuable device memory is required to hold the larger objects and this memory is required even when the remote access and control features are not being used.

Furthermore, existing Java techniques require that the server application be programmed with complementary programming can access the objects on the device. Any upgrades to device objects will generally require an accompanying upgrade of the complementary server application, which can create inconvenience and inefficiency during software development.

SUMMARY OF THE INVENTION

It is an object of the present invention to provide a novel method and system for remotely observing and controlling objects which obviates or mitigates at least one of the disadvantages of the prior art.

In one embodiment of the invention, there is provided a method for remotely probing a probeable-object in a device from an application in a server, comprising the steps of:

registering a probe-type of the probeable-object;
reporting the probe-type to the application;
determining an appropriate probe compatible with the probe-type;
deploying the appropriate probe in the device;
introducing the probe to the probeable-object; and probing the probeable-object.

In another embodiment of the invention there is provided a system for remotely probing at least one probeable object comprising a device operable to execute the at least one probeable object and a probeable-registry object, the at least one probeable object having a first interface for reporting a probe-type to the probeable-registry object. The at least one probeable object also has a second interface for interaction with at least one probe object compatible, which is with the probe-type of the at least one probeable object. The device also a first network interface means.

The system also includes a server that has a second network interface means connectable with the first network interface means via a communication medium. The server also includes a file storage means for storing the at least one probe object, and the server is operable to execute a probe-registry managed object that is a proxy for the probe-registry object. The server is also operable to execute an application interacting with the probe-registry managed object. The application performs a variety of functions, including the downloading of the at least one probe object to the device. The application will consider whether to download the probe object based on an operation that considers, at least in part, the reported probe-type, which was received via the probe-registry managed object.

The server is also operable to execute a probe managed-object that is a proxy for the at least one probe object, and the probe managed-object can interact with the application. In addition, the server is operable to execute the application, such that when the at least one probe object interacts with the at least one probeable-object the application can probe the at least one probeable object.

In a particular aspect of the invention, the probing performed by the application is an observation of an event within the probeable object. The observation can be made through a method call to the object, made via the probe managed object and the probe object. Alternatively, the observation can be made when the object generates an event, which is reported back to the application via an event handling service incorporated into the probe object and the probe managed object.

In another particular aspect of the invention, the device and server are Java-based, and the probeable object is a JavaBean.

In another particular invention, the probe managed object is created using the mogen tool from the Java Dynamic Management Kit.

Overall, the present invention provides a method and system for remotely observing and controlling objects in a networked computer, such as an intelligent device connected to a server, which uses less hardware resources in the device than conventional observation and controlling techniques. Once the probe function is complete, the probe object unloads from the device, freeing up random access memory on the device. The result is that the device can be remotely observed and controlled with a reduced consumption of device hardware resources, and updates to device software only require the creation of a new probe object, without requiring an accompanying update of the server application.

BRIEF DESCRIPTION OF THE DRAWINGS

The present invention will now be explained, by way of example only, with reference to certain embodiments and the attached Figures in which:

FIG. 3 is a flow-chart of a method for remotely observing and controlling a device in accordance with an embodiment of the present invention;

DETAILED DESCRIPTION OF THE INVENTION

Figure 1:
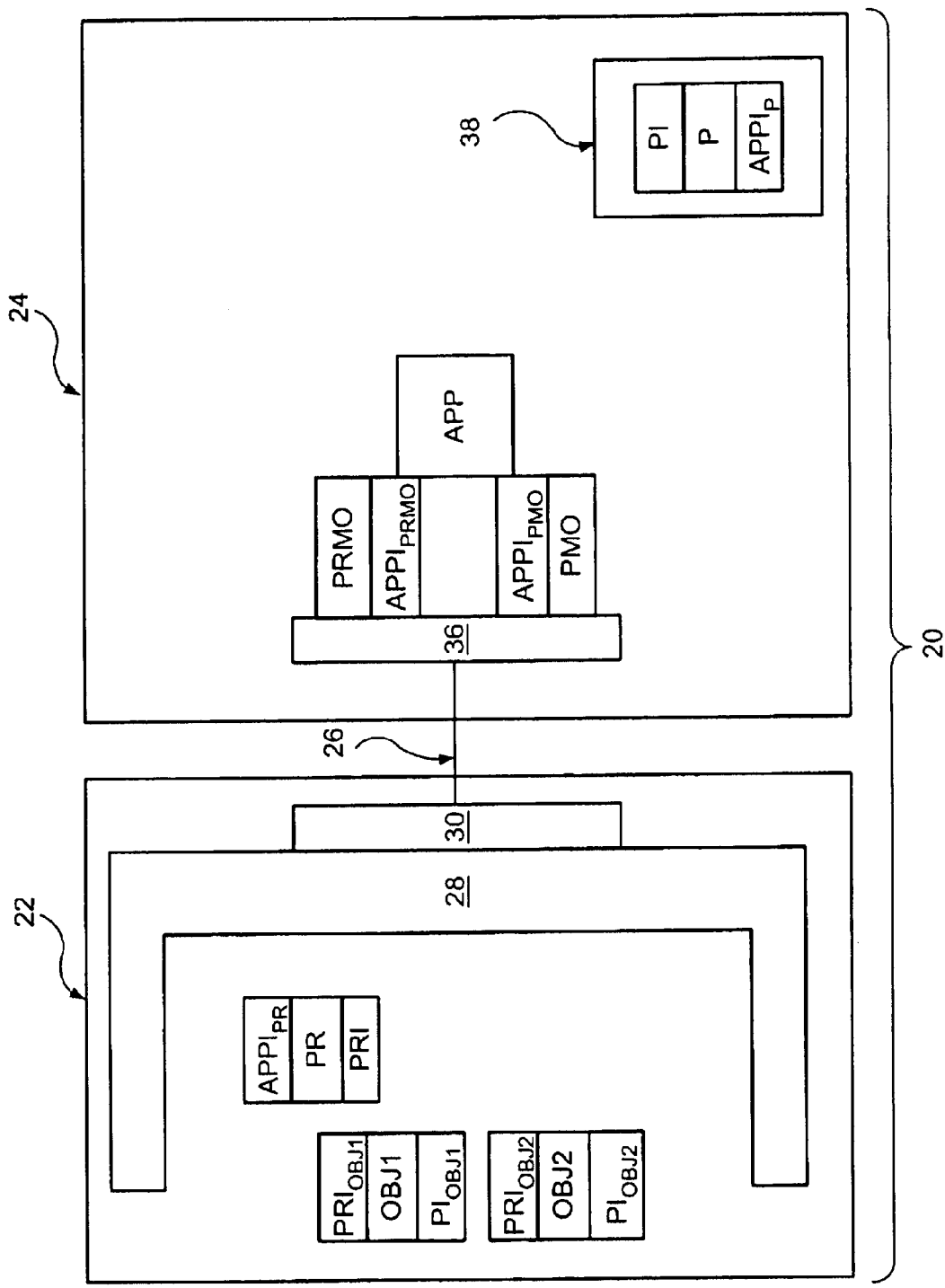
FIG. 1 is a schematic diagram of a system for remotely observing and controlling a device in accordance with an embodiment of the present invention.

Referring now to FIG. 1, a system for remotely observing and controlling objects in a device is indicated generally at 20. System 20 includes a device 22 and a server 24. Device 22 can be any intelligent device and examples of such devices include 'thin-client terminals', internet-aware screen phones, mobile phones, personal digital assistants ("PDAs"), public kiosks, smart-card based banking devices, etc. Device 22 is generally operable to execute software applications that are downloaded into it. In a presently preferred aspect of the invention, such applications are created in a platform-independent language.

In a present embodiment of the invention, device 22 is Java-based and has a minimum set of hardware resources including a central processing unit (not shown), random access memory (not shown) and a communications interface, such as a TCP/IP network interface means (not shown), to allow device 22 to communicate over a communication medium 26 or network such as the internet.

Server 24 can be any suitable server known in the art, such as the Sun Enterprise 450 server sold by Sun Microsystems of Palo Alto Calif., and functions as a network computing server. In an embodiment of the invention, server 24 is Java-based and includes a central processing unit (not shown), random access memory (not shown), a hard-disc drive or other data storage means 38, and a communications interface, such as a network interface card or other network interface means(not shown) to allow server 24 to communicate over communication medium 26.

Software applications within device 22 include a Java-based framework 28 that is associated with JavaBean objects $OBJ_1$ and $OBJ_2$. Specifications for frameworks and Java-Beans can be found in *Java Dynamic Management Kit 3.0 Programming Guide*, Chapter 10, 1998 Sun Microsystems, Inc. 901 San Antonio Road, Palo Alto, Calif. 94303 U.S.A. ("JDMK") and *Sun Microsystems, JavaBeans™*, Version 1.01, Hamilton, G., Editor, 1996, Sun Microsystems Inc., Mountain View Calif. ("JavaBeans Specification").

Accordingly, it will be understood by those of skill in the art that framework 28 is a type of registry for registering references to objects $OBJ_1$ and $OBJ_2$. It will be further understood that objects $OBJ_1$ and $OBJ_2$ form at least a portion of at least one software application intended for execution on device 22. In other embodiments, there can be a different number of objects $OBJ_1$ and $OBJ_2$, and/or objects $OBJ_1$ and $OBJ_2$ can be another type of program-language or component architecture, as will occur to those of skill in the art. It will be further understood that framework 28, or another registry mechanism, can be incorporated into each object $OBJ_1$ and $OBJ_2$, thus eliminating the need for a separate framework 28.

In the present invention, objects $OBJ_1$ and $OBJ_2$ are capable of being probed, i.e. are 'probeable'. Each probeable object $OBJ_n$ includes a probe interface $PIOBJ_n$. As will be discussed in greater detail below, probe interfaces $PIOBJ_1$ and $PIOBJ_2$ can also interact with other objects to allow objects $OBJ_1$ and $OBJ_2$ to fulfill their probe-function. Probe-functions are generally divided into two areas, observation and control.

Observation functions observe and report on the status of, and/or events, that occur within an object and can include any function associated with the object that relates to a hardware state of device 22 or a software state of a software application executing on device 22. For example, depending on the hardware components and/or software of device 22, possible events for observation and reporting can include: the amount of available random access memory; the amount of available persistent storage memory; the presence of a smart-card attached to device 22; a battery low indicator; preference settings, (i.e. language, time-zone etc.) for device 22 or for an application executing on device 22; or the user-identity of a user of device 22.

Typically, reported events are sent to server 24, or another remote computer, and an event can be reported in two ways: (i) by requesting the report using a method call to object $OBJ_n$ (which, for example, reports the available amount of RAM memory in response to the request for this information); or (ii) by generating the report by object $OBJ_n$ using an Event Handling Service (for example, reporting that a low battery condition has been encountered). A suitable Event Handling Service will be discussed in greater detail below.

Control functions can change hardware states or software states within device 22 and are achieved by an external instruction to the object. Depending on the hardware components and/or software components of device 22, possible control functions can include: initiating an energy-saving mode such as a "sleep" mode; updating the contents of a smart-card attached to device 22; initiating a download to random access memory; or changing preference settings (i.e. changing the time to daylight savings time). Typically, the control functions are received from server 24 or another remote computer.

An object is controlled using a method-call to the object. As mentioned above, objects $OBJ_1$ also include a probeable registry interface $PRI_{OBJN}$. This interface can be used to report the probeable-object type of $OBJ_n$ to an object probe registry PR in device 22. Probe registry PR is a managed-bean object or "m-bean", (the specifications for which are discussed in Chapter 3 of *JDMK*,) and includes interfaces PRI and $APPI_{PR}$. Through its PRI interface, each object $OBJ_n$ can register their probeable-object type with probe registry PR. Probe registry PR also maintains a register of information reported by objects $OBJ_n$. A probe registry managed-object PRMO complementary to probe registry PR, resides in server 24. Probe registry managed-object PRMO is created in server 24 by performing a managed-object generation operation on probe registry PR in the device 22 currently connected to server 24 by communication media 26. It will be understood that probe registry managed object PRMO is an appropriate representation of probed registry PR, and can be a client-bean ("c-bean"), proxy, shell or wrapper of probe registry PR. In a present embodiment, the managed-object generation operation is achieved with the "mogen" tool provided with the Java Dynamic Management Kit, and discussed in "Generating a C-bean" of Chapter 2 of *JDMK*. It is to be understood, however, that other managed-object generation operations can be used as will occur to those of skill in the art.

Probe registry PR and probe registry managed-object PRMO each interfaces $APPI_{PR}$ and $APPI_{PRMO}$, respectively. As probe registry managed-object PRMO operates as a proxy for probe registry PR, method calls to $APPI_{PRMO}$ are passed to interface $APPI_{PR}$ in a manner that is transparent to an object making the call to interface $APPI_{PRMO}$.

In addition, a first Event Handling Service is incorporated into probe registry PR and probe registry managed-object PRMO, such that events generated by probe registry PR are reported directly to probe registry managed-object PRMO. In turn, the reported event becomes available to an object or an application listening to probe registry managed-object PRMO, via an event call-back mechanism. In a present embodiment, the first Event Handling Service is established in accordance with the Java Dynamic Management Kit, as explained in Chapter 15 of *JDMK*.

It will be thus understood that interface $APPI_{PRMO}$ operates as a proxy for interface $APPI_{PR}$, allowing transparent access of probe registry PR from server 24. Accordingly, probe registry PR can respond to method calls that request the contents of its registry, or probe registry PR can report its registry contents, as they change, using the first Event Handling Service.

A Java-based client-adapter 30 connects framework 28 to software on server 24 via a complementary Java-based server-adapter 36 resident on server 24. Collectively, server-adapter 36 and client-adapter 30 form an adapter, as discussed in Chapter 5 of *JDMK*. It will be understood by those of skill in the art that client-adapter 30 is a software interface to the network interface card, or other communications means, of device 22, and server-adapter 36 is a software interface to the network interface card, or other communications means, of server 24, and that both network interface cards are interconnected over communication medium 26. It is to be understood, however, that other adapters or adapter-means can be used for other types of programming languages and structures, as will occur to those of skill in the art.

Server 24 includes at least one probe P, stored in file-storage means 38. Each probe P is also a managed-bean object or "m-bean", the specifications for which are discussed in Chapter 3 of *JDMK*. A probe P includes interfaces PI and $APPI_P$ and is destined for deployment on device 22. When deployed on device 22, probe P uses its interface PI to interact with compatible interfaces on probeable objects within device 22. Thus, where an object $OBJ_n$ is the same probe-type as probe P, then probe P can receive event messages from that object $OBJ_n$, and also provide control method-calls thereto.

It is contemplated that interface $PIOBJ_1$ can differ for some objects, such that each object $OBJ_1$ and object $OBJ_2$ requires its own probe P. For example, an object relating to hardware functions/status of device 22 can have a different PIOBJ interface than an object relating to application status or configuration. In another embodiment of the present invention, objects $OBJ_1$ and $OBJ_2$ can have multiple interfaces to allow them to interact with a variety of different probes P. For example, every object can have the same PIOBJ interface for generically reporting its status and these objects can also have different PIOBJ interfaces to permit configuration and/or control of their specific functions.

Software in server 24 also includes a probe managed-object PMO for each probe P, which is created by performing a managed-object generation operation on each probe P. It will be understood that probe managed-object PMO is a suitable representation of probe P, such as a client-bean ("c-bean"), proxy, shell or wrapper. As discussed earlier, in a present embodiment, the managed-object generation operation is the "mogen" tool provided with the Java Dynamic Management Kit.

Each probe P includes a second Event Handling Service, as does each corresponding probe managed-object PMO, such that events received by a probe P (from probeable objects $OBJ_1$) are reported directly to the corresponding probe managed-objects PMO, thus making the reported event available to an object or application listening to probe managed-object PMO via an event call-back mechanism. In a present embodiment, the second Event Handling Service is also established in accordance with the Java Dynamic Management Kit, as explained in Chapter 15 of *JDMK*.

It will be thus understood that interface $APPI_{PMO}$ is a proxy for interface $APPI_P$, allowing transparent access to probe P via probe managed-object PMO. Accordingly, probe P can respond to method calls sent via probe managed-object PMO, or probe P can report observed events to a listener of probe managed-object PMO as the events change, using the second Event Handling Service.

Server 24 also includes a Java-based server application APP. As will be apparent to those of skill in the art, application APP can interact with probe registry PR via probe registry managed-object PRMO, either through method calls or by listening for events. Likewise, application APP can interact with a probe P (when it is deployed on device 22) by interacting with probe managed-object PMO, either through method calls or by listening for events.

Figure 2:
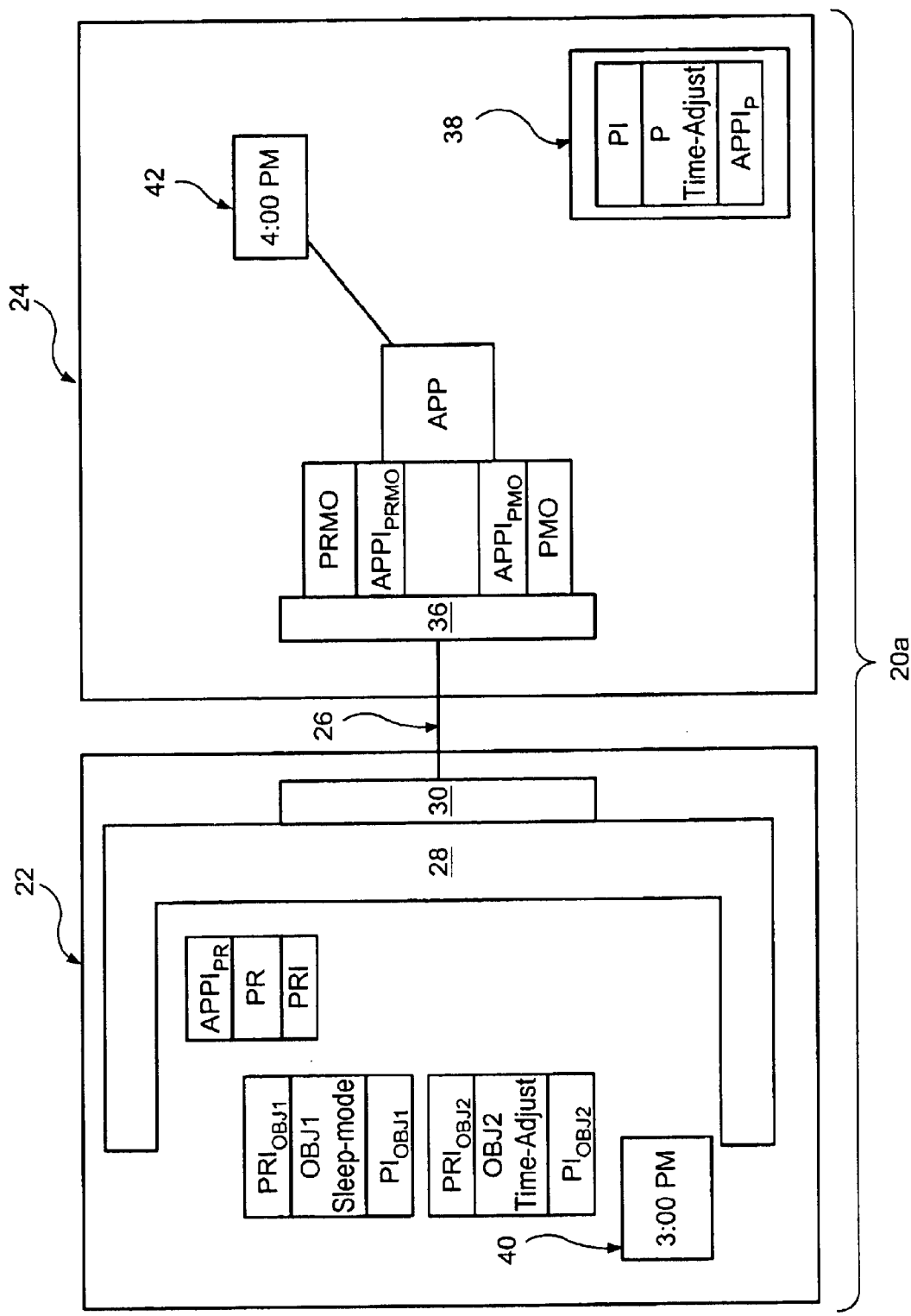
FIG. 2 is a schematic diagram of a system for remotely observing and controlling a device in accordance with a second embodiment of the present invention.

A method of remotely observing and controlling device 22 from server 24 will now be discussed, with reference to a specific example of system 20a shown in FIG. 2 and the flowchart of FIG. 3. It will be understood that like components in FIGS. 1 and 2 are indicated with like reference numbers.

In this example, device 22 is an intelligent device having a plurality of hardware components including random access memory and a sleep-function for placing the device in a sleep mode which reduces energy consumption by device 22. Additionally, in this example device 22 is executing a software application called 'Clock' that displays the time of day on a display screen 40, which currently is displaying the time of "3:00 PM". 'Clock' has a user interface which allows a user of device 22 to request a calibration of the clock on device 22 with a clock 42 on server 24. The following table shows the observation/control functions of each object $OBJ_1$, $OBJ_2$, in device 22.

TABLE I

Device Objects

| Object | Name | Probe-function | Compatible Type |
|---|---|---|---|
| $OBJ_1$ | Sleep-mode | Observation: Report status of sleep mode<br>Control: Toggle sleep-mode/awake-mode | A |
| $OBJ_2$ | Time Adjust | Observation:<br>1) Report user request for clock calibration;<br>2) Report Time of clock<br>Control: Adjust time on clock | B |

Accordingly, object $OBJ_1$ can interact with the hardware of device 22 to observe whether device 22 is in sleep-mode, and to control device 22 to toggle between sleep-mode and awake-mode. Object $OBJ_2$ can interact with the 'Clock' software application to report a user-request to calibrate the clock on device 22, report the time of the clock on device 22 and to adjust (i.e. control) the time of the Clock application on device 22.

Referring to FIG. 2, server 24 is Java-based and includes time-adjust probe P, being a type "B" probe, currently stored on data storage means 38. In a present embodiment, application APP executing in server 24 can deploy probe P into device 22 to interact with 'time-adjust' object $OBJ_2$ and thereby remotely observe and/or control the clock on device 22. Additionally, server 24 has an internal clock 42 which can be accessed by application APP. The time on internal clock 42 is currently "4:00PM".

Figure 4:
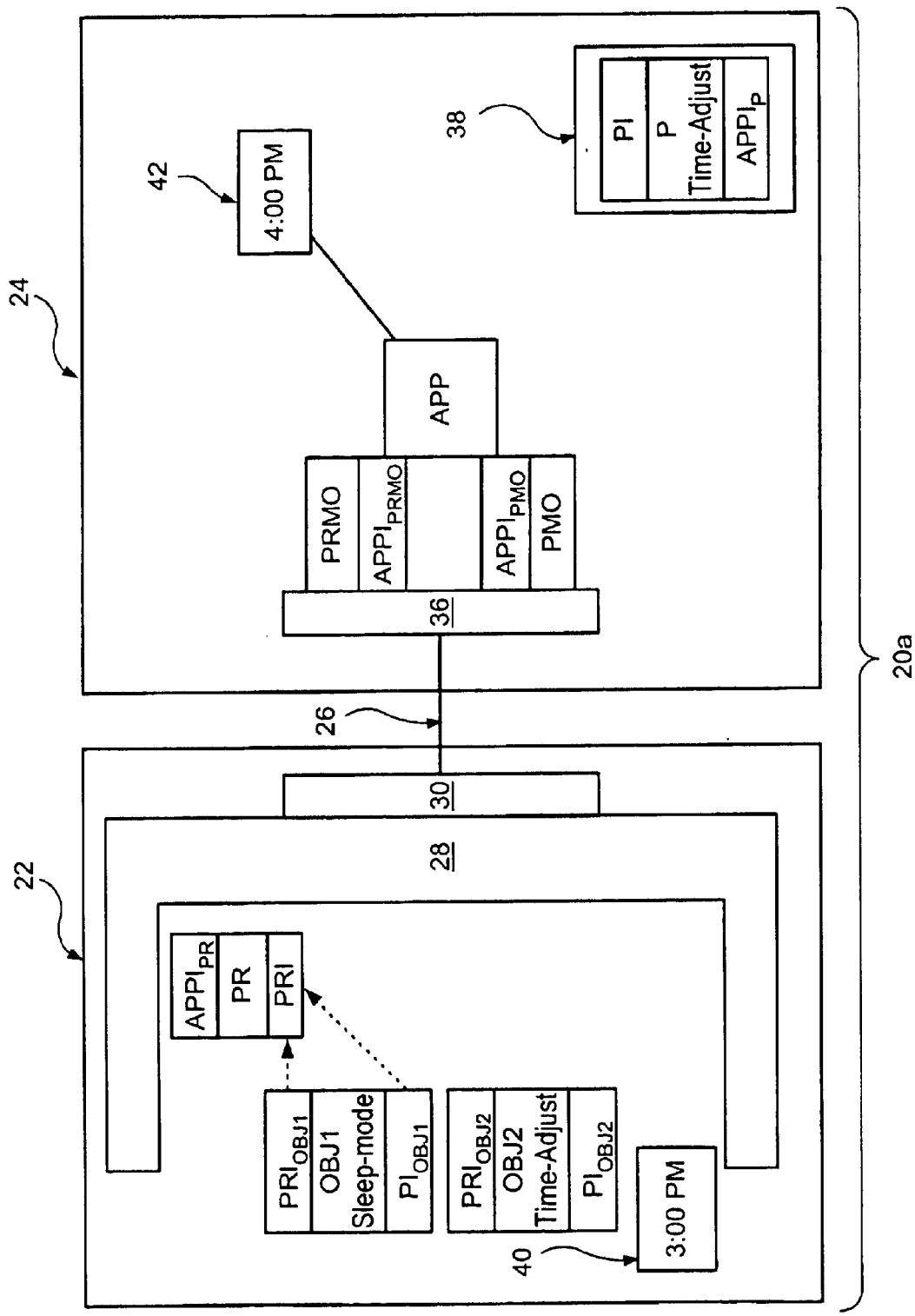
FIG. 4 is a schematic diagram of the system of FIG. 2 in accordance with the performance of step 100 of the method of FIG. 3.

Referring now to FIG. 3, at step 100 probeable objects are registered with the probe registry PR. As shown in more detail in FIG. 4, probeable object $OBJ_1$ makes a method call to probe registry PR, communicating through interface $PRIOBJ_1$ and PRI, as shown in dashed line. Object $OBJ_1$ notifies probe registry PR that it is compatible with probe-type "A". Similarly, object $OBJ_2$ makes a method call to probe registry PR, communicating using interfaces $PRIOBJ_2$ and PRI, as shown in dashed line. Object $OBJ_2$ notifies probe registry PR that it is compatible with probe-type "B".

Typically, step 100 occurs on power-up or initialization of device 22. However, it will be understood that objects $OBJ_1$ and $OBJ_2$ can use other criteria to determine when, if ever, it is appropriate to register themselves with probe registry PR, and objects $OBJ_1$ and $OBJ_2$ need not register themselves simultaneously. One example of such an alternate criteria is an input from a user into device 22, which triggers object $OBJ_1$ or $OBJ_2$ to register themselves. Similarly, objects $OBJ_1$ and $OBJ_2$ can choose to de-register and re-register themselves from probe registry PR at any time.

Figure 5:
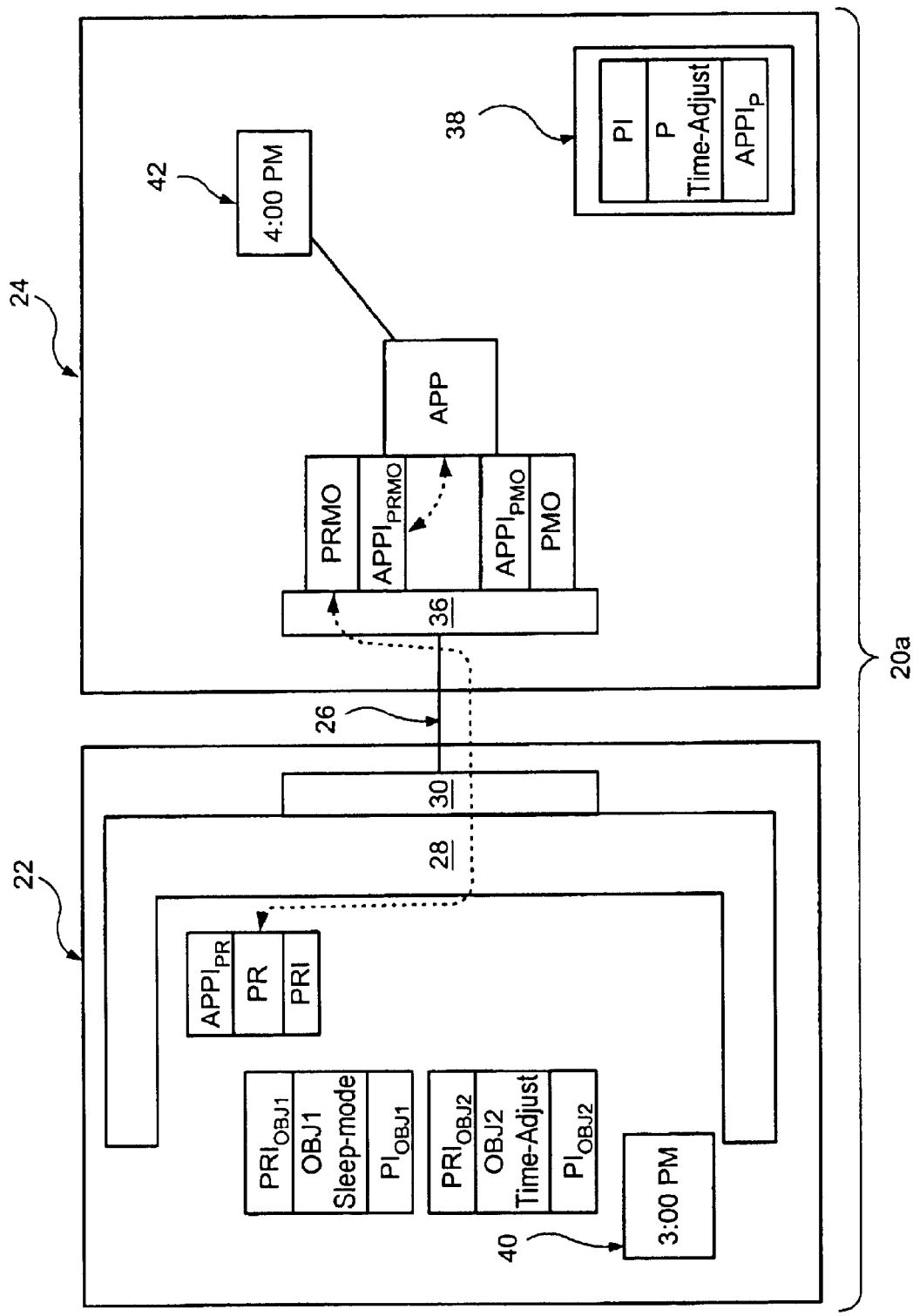
FIG. 5 is a schematic diagram of the system of FIG. 2 in accordance with the performance of step 120 of the method of FIG. 3.

Referring again to FIG. 3 at step 120 probe registry PR transfers its list of probeable device objects to application APP. Step 120 is shown in greater detail in FIG. 5 where, as shown in dashed line, application APP makes a method call to interface $APPI_{PRMO}$, which is transparently passed to interface $APPI_{PRMO}$, and requests that probe registry PR return the contents of its list of probeable object types. In response, probe registry PR returns its list of probeable objects to application APP.

It will be understood that while step 120 is made via a method call, in other embodiments of the invention probe registry PR can simply report the list of probeable object types using the first Event Handling Service between probe registry PR and probe registry managed-object PRMO. Similarly, probe registry PR can use the first Event Handling Service to spontaneously report any changes of its contents directly to application APP. Such changes can include whether any objects $OBJ_n$ have deregistered or registered themselves with probe registry PR.

When it is desired or required to probe an object on a device 22, at step 140 an appropriate probe is determined for deployment to device 22. In a present embodiment, application APP makes this determination based on a predefined operation, which considers, at least in part, the list of probeable object types returned from probe registry PR, the probeable object types stored in file storage means 38 and the actual report of control function which is required. In a present example, server 24 only has time-adjust probe P stored in storage means 38, which is a type "B" probe. Accordingly, application APP determines that the appropriate probe is time-adjust probe P.

It will be now apparent that in other embodiments, other criteria can be used in the determination of an appropriate probe. For example, where server 24 has additional probes stored in storage means 38, including a type "A" probe, then application APP could determine that a type "A" probe is appropriate. Similarly, application APP can determine that multiple probes are appropriate. It is also contemplated that server 24 can have a "generic" probe, capable of interaction with both type "A" and type "B" probeable objects, but with reduced functionality. Overall, it will be apparent to those of skill in the art that the various probeable object types and probes can be tailored to fit the needs of device 22 and server 24.

Figure 6:
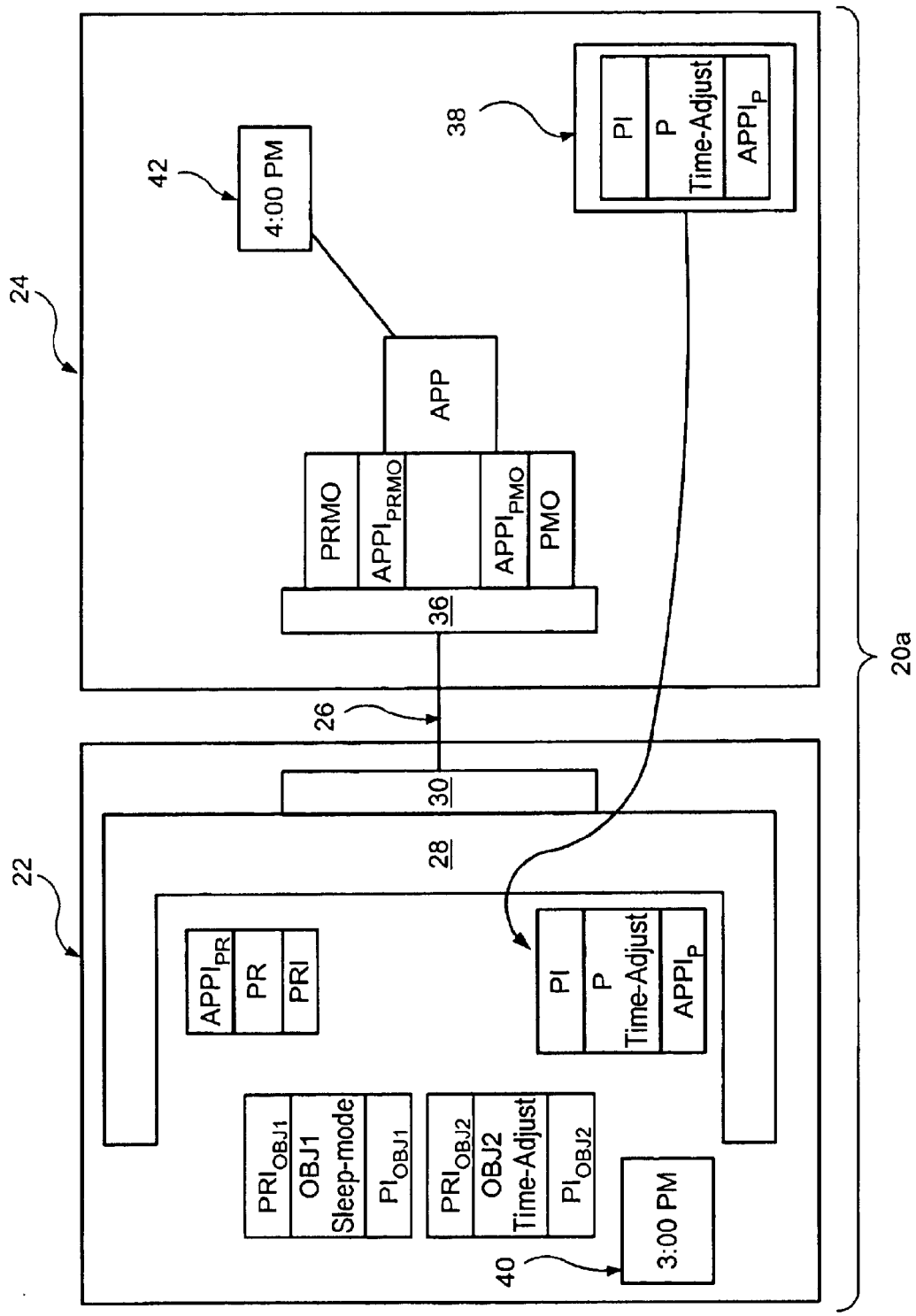
FIG. 6 is a schematic diagram of the system of FIG. 2 in accordance with the performance of step 160 of the method of FIG. 3.

At step 160, the appropriate probe determined at step 140 is deployed to device 22 as shown in FIG. 6. As shown in solid line, probe P is downloaded from server 24 onto device 22 via communication medium 26.

Figure 7:
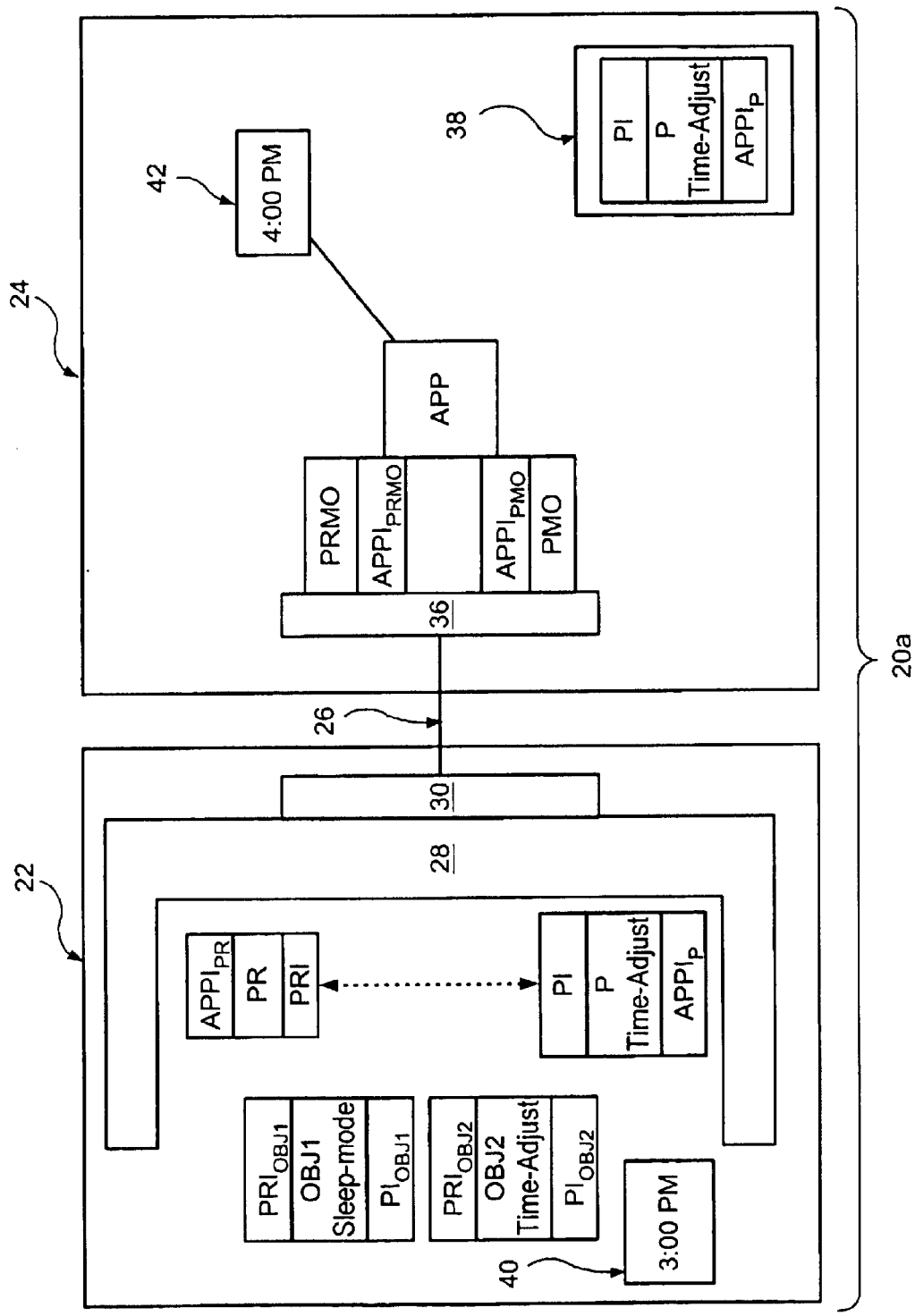
FIG. 7 is a schematic diagram of the system of FIG. 2 in accordance with the performance of step 180 of the method of FIG. 3.

Once a probe P has been deployed to device 22, the method continues at step 180 where probe P is registered with probe-registry PR in order to obtain a reference to time-adjust probeable object $OBJ_2$. As shown in FIG. 7, probe P makes a method-call, represented by dashed line, from its interface PI to probeable-registry interface PRI of probe registry PR, to obtain a reference to object $OBJ_2$.

Figure 8:
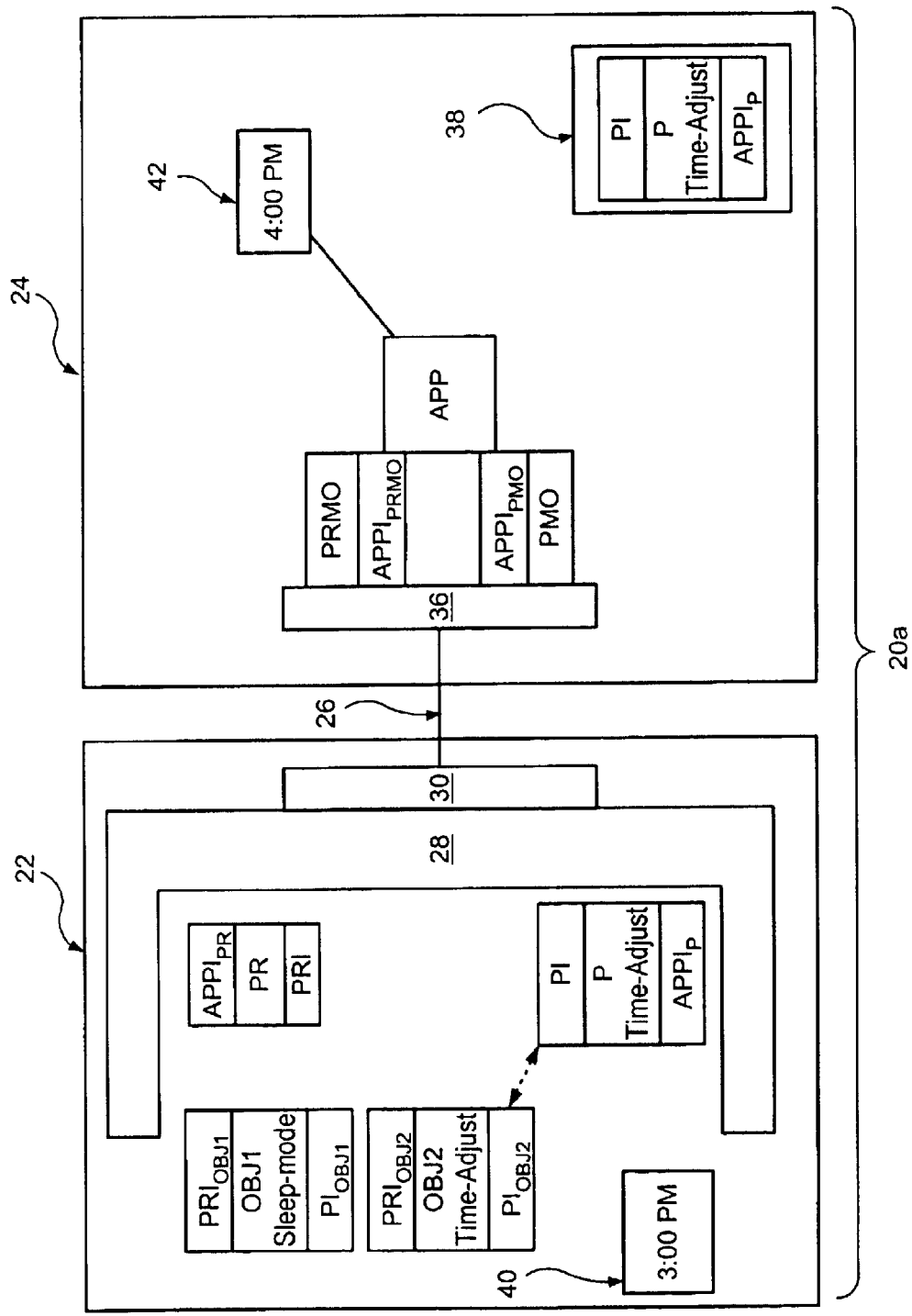
FIG. 8 is a schematic diagram of the system of FIG. 2 in accordance with the performance of step 200 of the method of FIG. 3.

Next, at step 200, probe P introduces itself to object $OBJ_2$. As shown in FIG. 8, probe P makes a method-call to object $OBJ_2$, notifying object $OBJ_2$ that probe P wishes to commence probing object $OBJ_2$. In response, object $OBJ_2$ sets up its probe-functions, by configuring itself to accept method-calls from probe P and to make method-calls to probe P via interface $PIOBJ_2$.

Figure 9:
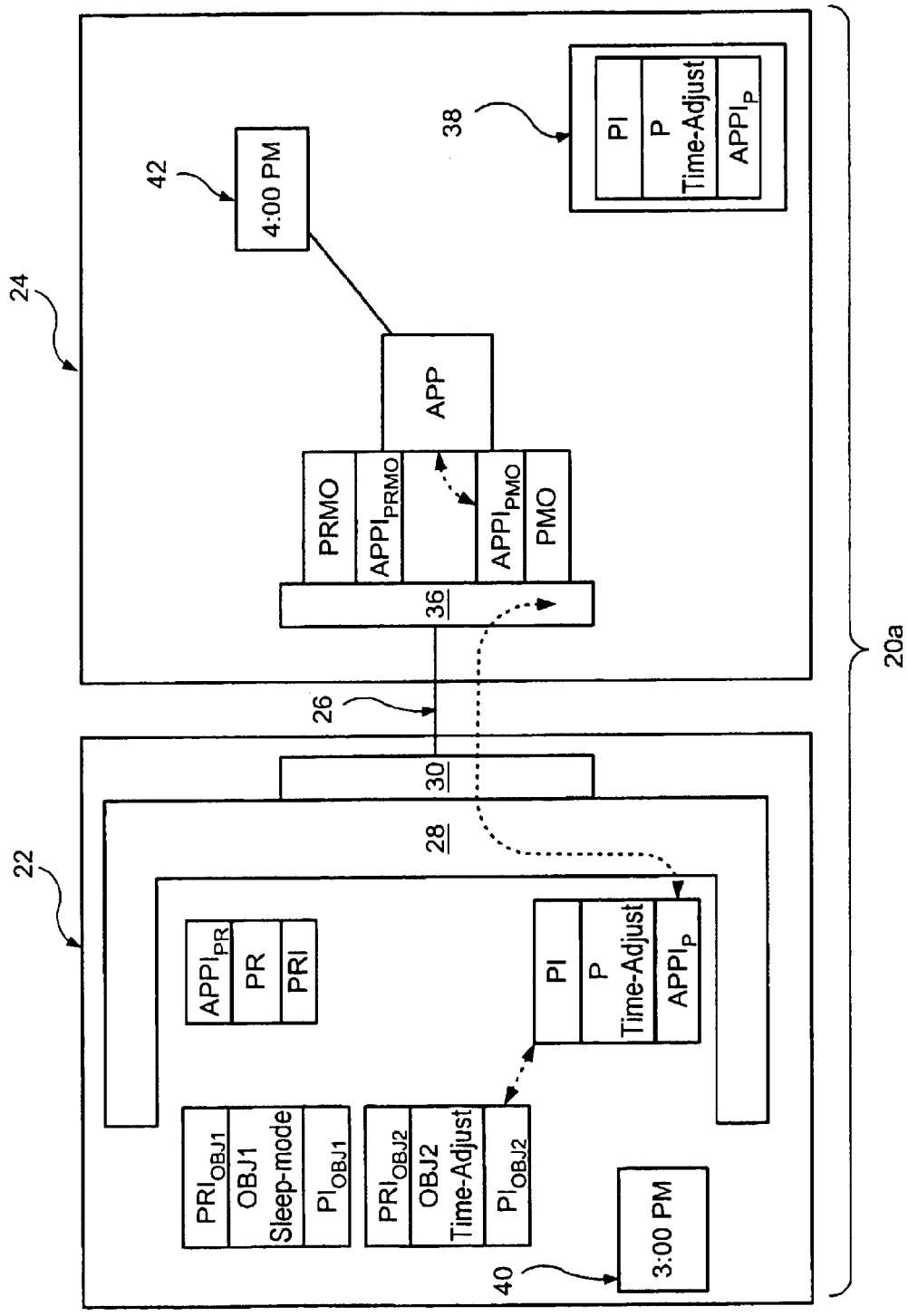
FIG. 9 is a schematic diagram of the system of FIG. 2 in accordance with the performance of step 220 of the method of FIG. 3.

Next, at step 220, probe P performs its probe-functions as shown in more detail in FIG. 9. Object $OBJ_2$ receives a user-input that the user of device 22 wishes to calibrate the device clock with server clock 42. In turn, object $OBJ_2$ reports this event to probe P, which uses the second Event Handling Service to generate an event back to probe managed-object PMO in server 24. As application APP is listening to the second Event Handling Service, application APP receives the message reporting this event and can respond accordingly.

Next, object $OBJ_2$ makes a method call to probe P, via probe managed-object PMO, requesting the time of the clock application on device 22. In turn, probe P makes a method call to object $OBJ_2$ requesting the clock time, and accordingly, the time "3:00PM" is returned to application APP. Finally, application APP uses this reported value in an operation to determine whether to send a control function to device 22. In the present example, application APP determines that the time in server clock 42 is "4:00PM", one hour ahead of the clock in device 22. Application APP thus determines that the time in the clock application executing on device 22 should be updated. Application APP then makes a method-call to probe P via interface $APPI_{PMO}$, instructing probe P to change the time in the device clock to "4:00PM". In turn, probe P makes a method-call to time-adjust object $OBJ_2$ via interfaces PI and $PIOBJ_2$ to update the time to "4:00PM".

At step 240, probe P's function is complete, and probe P can be unloaded from device 22. Typically, step 240 involves a method-call from application APP notifying probe P that its function is complete, which causes probe P to make a method call to object $OBJ_2$ to shut-down its probe-function. In response, object $OBJ_2$ reconfigures itself, removing the ability of interface $PIOBJ_2$ to accept method-calls from probe P and to make method-calls to probe P. Probe P then deregisters itself from framework 28 and is removed from device 22 using Java garbage collection techniques.

Figure 10:
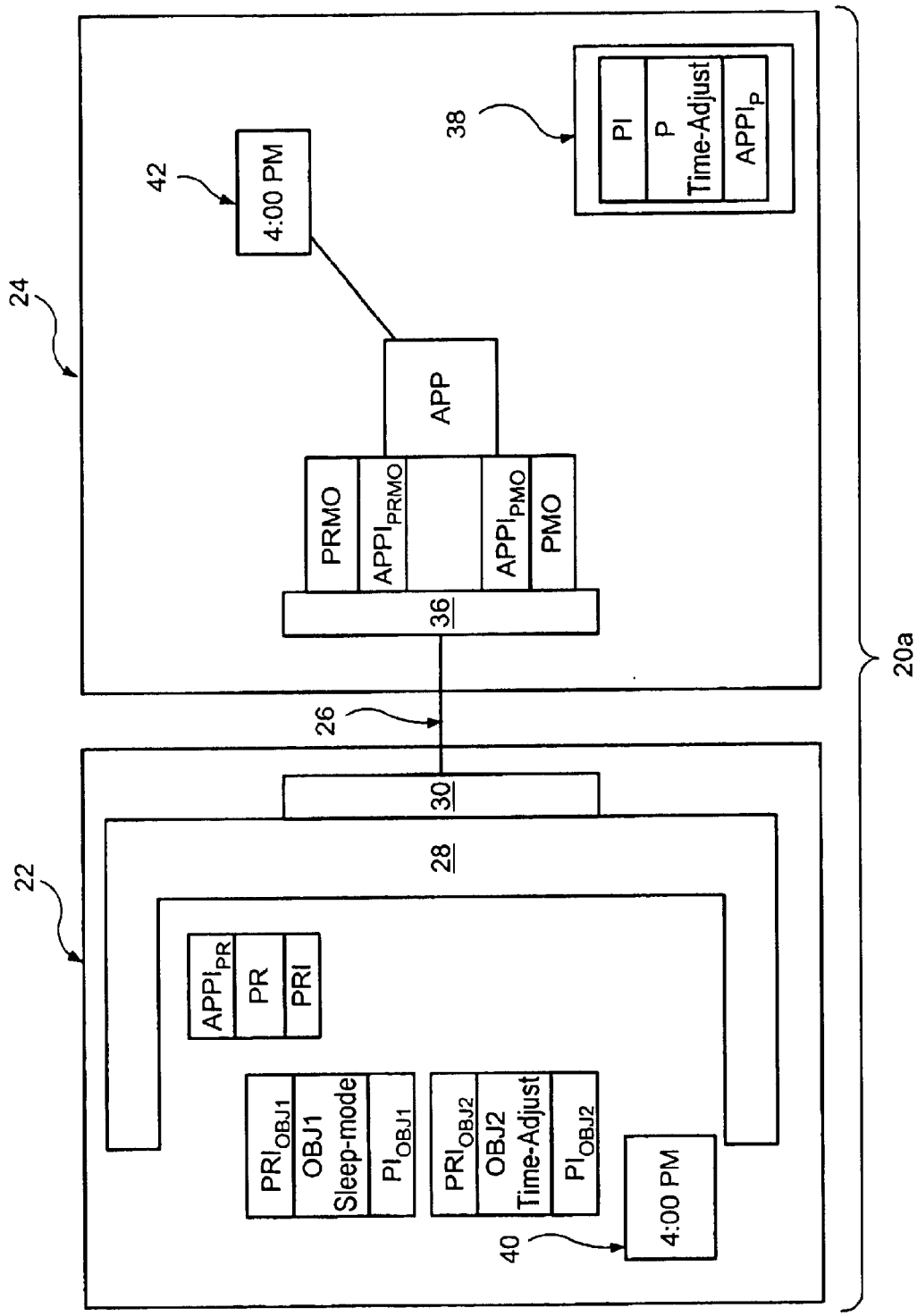
FIG. 10 is a schematic diagram of the system of FIG. 2 in accordance with the performance of step 240 of the method of FIG. 3.

FIG. 10 shows additional detail of step 240. The time displayed on display 40 has been updated to "4:00PM", probe P has been unloaded from the device's memory, and the communication via the second Event Handling Service between device 22 and server 24 has been terminated.

It will be apparent that in other embodiments, step 240 can occur based on any criteria and operations unique to application APP and/or device 22, as will occur to those of skill in the art.

While the foregoing example is directed to the observation and control of a clock application executing in device 22, it will now be apparent to those of skill in the art that in other embodiments of the invention any observation function can be reported and/or any control function to be performed on device 22 by making appropriate modifications. For example, device 22 can be remotely placed into 'sleep-mode' by deploying a sleep-mode probe to interact with object $OBJ_1$.

Further, while the embodiments discussed herein are directed to particular implementations of the present invention, it will be apparent that the sub-sets and variations to these embodiments are within the scope of the invention. For example, while the embodiments herein are directed to JavaBean objects, it will be apparent that other types of objects and component architectures can be implemented in accordance with the teachings of the invention. Further, while it is presently preferred to store probe P on server 24 in order to save hardware resources (such as memory) on device 22, it will be understood that probe P can be stored directly on device 22 or in any other suitable storage location.

It will be understood that each of the objects in the embodiments discussed herein can include one or more other interfaces for interaction with other objects and/or other probes.

The present invention provides a novel method and system of remotely observing and controlling objects on a device from a server. Overhead memory is saved as one probe can communicate with a group of probeable objects of the same probe-type, thus obviating the need for each device object to communicate directly with the server. Further, the probe object can be removed from memory when not in use to save more device memory, and need never occupy persistent storage space in the device. The present invention also provides a useful development tool, as the system and method can be used by a software and device hardware developers, to remotely observe and control device software and hardware functionality. Upgrades to the device software do not require the rewriting of an application in the server, but simply require the creation of a new probe which can be stored on the server for later deployment on the device.

We claim:

1. A method for remotely probing a probeable-object in a device from an application in a server, comprising the steps of:
    registering a probe-type of the probeable-object with a probe registry on the device;
    reporting the probe-type as registered in the probe registry to the application;
    determining an appropriate probe compatible with the probe-type, the probe being a separately executable entity from the application and the probeable-object;
    deploying the appropriate probe in the device;
    introducing the probe to the probeable-object; and
    probing the probeable-object.

2. The method according to claim 1 including an additional step of:
    unloading the probe from the device.

3. The method according to claim 1 wherein the probing step includes observing an event occurring in the probeable-object, and reporting the observation to the application.

4. The method according to claim 1 wherein the probing step includes controlling the probeable-object via a method-call from the application that changes a state within the probeable-object.

5. The method according to claim 1 wherein the reporting step is accomplished through an Event Handling Service from the Java Dynamic Management Kit.

6. The method according to claim 1 wherein the probeable-object is a JavaBeans bean.

7. A system for remotely probing a probeable object comprising:
    a device operable to execute the probeable object and a probe registry, the probeable object having a first interface for reporting a probe-type to the probe registry and a second interface for interaction with a probe object compatible with the probe-type, the device having a first network interface means;
    a server having a second network interface means connectable with the first network interface means via a communication medium, the server having a file storage means for storing the probe object;
    the server being operable to execute a probe-registry managed object that is a proxy for the probe registry, the server being further operable to execute an application interacting with the probe-registry managed object; the application deploying the probe object in the device based on an operation that considers at least in part the reported probe-type via the probe-registry managed object, wherein the probe object is a separately executable entity from the application and the probeable object;
    the server being further operable to execute a probe managed-object that is a proxy for the probe object and interacts with the application; and,
    the server being further operable to execute the application, wherein, when the probe object interacts with the probeable object, the application can probe the probeable object.

8. The system according to claim 7 wherein the application observes an event reported by the probeable object.

9. The system according to claim 8 wherein the probe object and the probe managed-object have an Event Handling Means for spontaneously generating a report to the application based on an event generated by the probeable object.

10. The system according to claim 9 wherein the probe object is an m-bean and the probe managed-object is created using a mogen tool from a Java Dynamic Management Kit.

11. The system according to claim 8 wherein the application issues a method-call to the probeable object via the probe object to observe an event within the probeable object.

12. The system according to claim 7 wherein the application controls a state within the probeable object via a method call through the probe managed-object.

13. The system according to claim 7 wherein the system is Java-based and the probe-registry managed object is created from the probe registry using a "mogen" tool from a Java Dynamic Management Kit.

14. The system according to claim 7 wherein the system is Java-based and the probe managed object is created from the probe object using a "mogen" tool from a Java Dynamic Management Kit.

15. A system for remotely probing at least one probeable object comprising:

a device operable to execute the at least one probeable object and a probe registry, the at least one probeable object having a first interface for reporting a probe-type to the probe registry and a second interface for interaction with at least one probe object compatible with the probe-type, the device having a first network interface means;

a server having a second network interface means connectable with the first network interface means via a communication medium, the server having a file storage means for storing the at least one probe object;

the server being operable to execute a probe-registry managed object that is a proxy for the probe registry, the server being further operable to execute an application interacting with the probe-registry managed object; the application deploying the at least one probe object in the device based on an operation that considers at least in part the reported probe-type via the probe registry, wherein the at least one probe object is a separately executable entity from the application and the at least one probeable object;

the server being further operable to execute a probe managed-object that is a proxy for the at least one probe object and interacts with the application; and, the server being further operable to execute the application, wherein, when the at least one probe object interacts with the at least one probeable-object, the application probes the at least one probeable object.

16. The system according to claim 15 wherein the at least one probeable object is a JavaBean.

17. A device capable of being remotely probed by an application executing in a server, the server having a file storage means for storing at least one probe object;

the server being operable to execute a probe-registry managed object that is a proxy for a probe registry, the probe-registry managed object capable of interaction with the application;

the application deploying the at least one probe object in the device based on an operation that considers at least in part a reported probe-type of at least one probeable object via the probe-registry managed object, wherein the at least one probe object is a separately executable entity from the application and the at least one probeable object;

the server being further operable to execute a probe managed-object that is a proxy for the at least one probe object and that interacts with the application;

the server having a server network interface means;

the device comprising:

a device network interface means connectable to the server network interface means via a communication medium;

the device being operable to execute the at least one probeable object and probe registry;

the at least one probeable object having a first interface for reporting a probe-type to the probe registry and a second interface for interaction with the at least one probe object, the at least one probe object being compatible with the probe-type;

wherein, when the application deploys the at least one probe in the device, the at least one probe object interacts with the at least one probeable-object so that the application probes the at least one probeable object.

18. A server for remotely probing at least one probeable object in a device, the device being operable to execute the at least one probeable object and a probe registry, the at least one probeable object having a first interface for reporting a probe-type to the probe registry and a second interface for interaction with at least one probe object compatible with the probe-type, the device having a device network interface means, the server comprising:

a server network interface means connectable with the device network interface means via a communication medium, the server having a file storage means for storing the at least one probe object;

the server being operable to execute a probe-registry managed object that is a proxy for the probe registry, the server being further operable to execute an application interacting with the probe-registry managed object; the application deploying the at least one probe object in the device based on an operation that considers at least in part the reported probe-type via the probe-registry managed object, wherein the at least one probe object is a separately executable entity from the application and the at least one probeable object;

the server being further operable to execute a probe managed object that is a proxy for the at least one probe object and interacts with the application, wherein, when the at least one probe object interacts with the at least one probeable-object, the application probes the at least one probeable object.

* * * * *